(12) United States Patent
Wiemeler et al.

(10) Patent No.: US 9,881,602 B2
(45) Date of Patent: Jan. 30, 2018

(54) SOUND SYSTEM FOR A MOTOR VEHICLE

(71) Applicant: TENNECO GMBH, Edenkoben (DE)

(72) Inventors: Dirk Wiemeler, Edenkoben (DE); Bernd Schädler, Edenkoben (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 15/324,840

(22) PCT Filed: Jul. 10, 2015

(86) PCT No.: PCT/EP2015/065873
§ 371 (c)(1),
(2) Date: Jan. 9, 2017

(87) PCT Pub. No.: WO2016/005580
PCT Pub. Date: Jan. 14, 2016

(65) Prior Publication Data
US 2017/0229108 A1    Aug. 10, 2017

(30) Foreign Application Priority Data

Jul. 11, 2014  (DE) .............. 10 2014 019 737
Jul. 11, 2014  (DE) .............. 20 2014 010 438 U

(51) Int. Cl.
*G10K 11/178*    (2006.01)
*F01N 1/06*    (2006.01)

(52) U.S. Cl.
CPC .......... *G10K 11/1788* (2013.01); *F01N 1/065* (2013.01); *G10K 2210/12822* (2013.01); *G10K 2210/3025* (2013.01)

(58) Field of Classification Search
CPC .... G10K 15/02; H04R 2499/13; H04B 1/082; B60L 2270/142; B60Q 5/008
USPC .......................................................... 381/86
See application file for complete search history.

(56) References Cited

U.S. PATENT DOCUMENTS

| | | | |
|---|---|---|---|
| 5,146,505 A | * | 9/1992 | Pfaff ...................... F01N 1/065 381/71.12 |
| 5,237,617 A | | 8/1993 | Miller |
| 5,325,438 A | | 6/1994 | Browning et al. |
| 5,414,230 A | | 5/1995 | Nieuwendijk et al. |
| 5,635,903 A | | 6/1997 | Koike et al. |
| 5,693,918 A | | 12/1997 | Bremigan et al. |
| 5,748,749 A | | 5/1998 | Miller et al. |
| 5,835,605 A | | 11/1998 | Kunimoto |
| 6,005,957 A | | 12/1999 | Meeks |
| 6,768,800 B2 | | 7/2004 | Enamito et al. |

(Continued)

FOREIGN PATENT DOCUMENTS

DE    4317403 A1    12/1994
DE    19701801 A1    7/1998
(Continued)

*Primary Examiner* — George Monikang
(74) *Attorney, Agent, or Firm* — Hudak, Shunk & Farine Co. LPA

(57) ABSTRACT

A sound system for a motor vehicle exhaust gas system for emitting emulated engine sounds, including at least one loudspeaker and at least one housing accommodating at least one loudspeaker. The housing is mounted separately from a motor vehicle exhaust gas system in terms of the routing of an exhaust gas flow, at least one sound guidance tube having an outlet zone being mounted on the housing.

10 Claims, 2 Drawing Sheets

(56) References Cited

U.S. PATENT DOCUMENTS

| | | | |
|---|---|---|---|
| 6,959,094 B1 | 10/2005 | Cascone et al. | |
| 7,891,463 B2 | 2/2011 | Kruger et al. | |
| 8,861,741 B2 | 10/2014 | Sugawara | |
| 8,955,455 B2 | 2/2015 | Tanaka et al. | |
| 9,386,366 B2 | 7/2016 | Koch et al. | |
| 2005/0169484 A1 | 8/2005 | Cascone et al. | |
| 2006/0177797 A1 | 8/2006 | Costello et al. | |
| 2008/0192954 A1 | 8/2008 | Honji et al. | |
| 2011/0216916 A1* | 9/2011 | Hera | G10K 15/02 381/86 |
| 2012/0027220 A1 | 2/2012 | Sugawara | |
| 2012/0257763 A1 | 10/2012 | Bowden et al. | |

FOREIGN PATENT DOCUMENTS

| | | |
|---|---|---|
| DE | 102005012463 B3 | 6/2006 |
| DE | 102007055477 A1 | 5/2009 |
| DE | 102008018085A1 A1 | 10/2009 |
| DE | 102009049280 A1 | 4/2011 |
| DE | 102012023643 A1 | 6/2013 |
| DE | 102013014455 A1 | 3/2015 |
| EP | 0805431 A2 | 11/1997 |
| EP | 0939577 A2 | 9/1999 |
| EP | 1562177 A2 | 8/2005 |
| EP | 2108791 B1 | 10/2009 |
| EP | 2202111 A2 | 6/2010 |
| EP | 2282033 A1 | 2/2011 |
| FR | 2858710 A1 | 2/2005 |
| JP | 02234599 A | 9/1990 |
| WO | 9715915 A1 | 5/1997 |
| WO | 2010119521 A1 | 10/2010 |
| WO | 2011005872 A2 | 1/2011 |
| WO | 2011092833 A1 | 8/2011 |
| WO | 2011109156 A1 | 9/2011 |

\* cited by examiner

SOUND SYSTEM FOR A MOTOR VEHICLE

FIELD OF THE INVENTION

The invention relates to a sound system for a motor vehicle exhaust gas system for emitting emulated engine sounds, comprising at least one loudspeaker and at least one housing accommodating at least one loudspeaker, wherein the housing is mounted separately from a motor vehicle exhaust gas system in terms of the routing of an exhaust gas flow, at least one sound guidance tube having an outlet zone being mounted on the housing.

The invention relates moreover to a motor vehicle with a sound system with a motor vehicle engine and with an exhaust gas system connected to the motor vehicle engine and having at least one exhaust gas tailpipe, wherein the housing is situated in the area of one end E of the exhaust gas system in regard to the routing of the exhaust gas flow.

The invention relates moreover to method for generating of emulated engine sounds, wherein at least one loudspeaker receives a control signal, and on the basis of at least one of the engine operating parameters of number of revolutions and/or engine load and/or gear engaged and/or engine temperature and/or other parameters like status of the regeneration operation of the diesel filter a sound profile is generated. The calculation is done directly on the basis of an in dependence on the at least one engine operating parameter which has been altered. For the calculation itself, several milliseconds of computing time are needed, so that the computed sound profile is generated with a corresponding delay.

BACKGROUND OF THE INVENTION

There is already known from DE 10 2008 018 085 A1 an active muffler for an exhaust gas system of an internal combustion engine. This describes an active muffler for an exhaust gas system in a multiple-shell housing, having a cup-shaped top shell and a cup-shaped bottom shell. Moreover, a connection pipe branch is provided, which is led through the bottom shell and out from the housing. The branch pipe serves for connecting the muffler to an exhaust gas conducting line of the exhaust gas system.

A sound generating system is known from U.S. Pat. No. 6,959,094 B1 which composes or synthesizes on the basis of a real vehicle model several components of the vehicle sound independently of each other, and then combines these into the final sound. The individual sound is generated here by means of characteristic operating parameters of the vehicle, while the final combination of the different sounds is assembled through a mixer or equalizer. With the proposed system it is not necessary to record vehicle sounds and provide them through a storage unit.

From U.S. Pat. No. 6,005,957 A there is known an AND (Active Noise Design) system, having a loudspeaker decoupled from the exhaust gas flow and a microphone. Through the microphone, an actual variable of the emitted sound of the loudspeaker and the exhaust gas system is detected. On the basis of this actual variable, a nominal value is determined for the loudspeaker signal through a feedback control circuit with actual vs. nominal comparison and put out to the loudspeaker.

As prior art for the emergence level, one should cite a publication in the context of the 16th International Congress on Sound and Vibration, Krakow, 5-9 Jul. 2009; "3 CYLINDERS PETROL ENGINES TAILPIPE SOUND QUALITY PROCESSED THROUGH AN ORIGINAL HEARING MODEL". This describes, under section 3, how a sound at times is not even audible, or only partly audible, due to masking effects, either through background noises or the interplay of several sounds. It defines for this an emergence level, whose magnitude is a measure of the audibility of a sound. If it is smaller than or equal to zero, then the sound is masked and is not subjectively audible. If it is greater than zero, then the "emergence level" indicates with what level or what loudness the sound is subjectively perceived.

The problem which the invention proposes to solve is to modify and dispose a sound system for a motor vehicle so that an improved sound impression, reduced costs, and a more variable application are assured.

The coupling of the sound system to the exhaust gas system, such as has been conventional thus far in the prior art, results in an immediate overlayering of the real engine sound, i.e., the engine sounds based on the exhaust gas, and the engine sounds emulated by the sound system within the exhaust gas flow, which is beneficial for the sound impression, at least as regards the sound source. It is generally known that, with the coupling of the sound system to the exhaust gas system, further influences need to be considered, involving the direct contact with the exhaust gas, especially the formation of condensate, the exhaust gas temperature, and the exhaust gas pressure, and that is mentioned here merely for sake of completeness.

However, the technical world was largely of the belief that a decoupling of the sound system, e.g. in order to circumvent the aforementioned influences, would lead to a worse sound impression.

SUMMARY OF THE INVENTION

The problem is solved according to the invention in that the sound system has a microphone-free design, wherein a control unit is provided, by which on the basis of at least one of the engine operating parameters of number of revolutions and/or engine load and/or gear engaged and/or engine temperature and/or other parameters like status of the regeneration operation of the diesel filter a sound profile can be computed, wherein the loudspeaker can receive a control signal corresponding to the sound profile through the control unit.

In the course of developing the notion of the invention it was found that this direct overlayering of exhaust-based engine sounds and emulated engine sounds makes an optimal attuning of the different sound sequences or sound frequencies relatively cumbersome. The use of a feedback control circuit, which uses the actual sound through a microphone as a correction variable, also causes not insignificant expense, which must also be represented through the available computing power. These drawbacks are overcome by a purely controlled variant without microphone. Both the sound profile and the sound pattern of the engine are portrayed purely mathematically on the basis of the mentioned engine operating parameters without taking into account the actual exhaust gas sounds. The resulting disadvantages are far less than one would expect.

The problem is also solved according to the invention in that the housing is situated in the area of one end E of the exhaust gas system in relation to the exhaust gas channeling, and the outlet zones of the sound system have a lengthwise dimension A1 in relation to a longitudinal axis of the motor vehicle, with $A1<=A$ or $A1>=A$. The outlet zone of the sound system is disposed either further back than the exhaust gas tailpipe or further forward than the exhaust gas tailpipe or the outlet zone of the sound system is disposed at the same height as the exhaust gas tailpipe. Different outlet zones of the sound system can have a longer or shorter lengthwise dimension A1 in relation to different exhaust gas tailpipes. Exhaust gas tailpipe diaphragms, which are secured to the respective end of the exhaust gas tailpipe, are to be considered as an exhaust gas tailpipe in the sense of the invention. Accordingly, when determining the lengthwise dimension A, it does not matter whether an exhaust gas tailpipe diaphragm or an exhaust gas tailpipe is at hand. The same holds for determining the lengthwise dimension A1 of the outlet zones of the sound system.

The problem is also solved according to the invention in that an anticipated sound pattern is composed on the basis of the engine operating parameters;

the sound profile computed by the control unit and the sound pattern are mathematically overlayered to form a sound image, or at least compared with each other;

the sound image is then investigated mathematically to see whether frequency components of the desired engine sound are masked by an envelope M, and therefore have an emergence level En with <=0;

in event of a masking of one or more of these frequency components an adapting of the sound profile is done by amplifying these frequency components, so that these frequency components are demasked and have an emergence level En with En>0.

Due to the masking effects, either from background noises or the interplay of multiple sounds and sonic waves, at times a sound will become inaudible or only partly audible. This is defined by the "emergence level". If it is smaller than or equal to zero, then the sound is masked and is not audible. If it is greater than zero, then the "emergence level" indicates with what level or what loudness the sound is subjectively perceived. It is important that the achieved "emergence level" be significantly above zero. How high it is on the whole depends on the desired sound image.

The desired frequency components for the sound image are the harmonic frequencies with an order between 2 and 50. These are preferably emulated and reproduced loud enough so that the desired emergence level En is achieved.

It may also be advantageous for this if the outlet zone of the sound guidance tube is modeled on an exhaust gas tailpipe.

Moreover, it can be advantageous if a control unit is provided, by which a sound profile can be computed on the basis of at least one of the engine operating parameters of number of revolutions and/or engine load and/or gear engaged and/or engine temperature and/or other parameters like status of the regeneration operation of the diesel filter, wherein the housing and the sound guidance tube can be provided with the computed sound profile through the loudspeaker, decoupled from the exhaust gas flow. The computation is done directly on the basis of and in dependence on the at least one engine operating parameter which has been altered. For the calculation itself, several milliseconds of computing time are needed, so that the computed sound profile is generated with a corresponding delay.

Furthermore, it can be advantageous when the emulated engine sound has modulations of the major orders or the major engine orders. The engine orders can be divided into major orders and secondary orders. The major orders should be divided into subharmonic orders and other orders. Fundamental characteristics of the sound impression result from the presence or absence of certain engine harmonic orders and secondary orders. In regard to an engine with four cylinders, for example, the major orders are first of all the ignition second harmonic order and then the fourth order. These are most often also utilized for an objective judgment as to the outlet noise. In the case of the secondary orders, the first and then the third order may occur.

It can also be advantageous when the exhaust gas system comprises at least one muffler and at least one exhaust gas aftertreatment unit, wherein the exhaust gas system at rated number of revolutions of the motor vehicle engine and rated load of the motor vehicle engine has a noise level P1 of at most 60 dB to 75 dB or 50 dB to 80 dB, wherein the sound system can generate a noise level P2 of the sound profile with P2>P1. Present-day exhaust gas systems are very quiet on account of the many exhaust aftertreatment components within the exhaust gas system. In an extreme instance, this can mean that the perceivable engine and exhaust sounds after moving through the exhaust gas system fall below a desired threshold value in terms of sound and/or loudness. In this case, by use of the sound system according to the invention, the desired sound for the exhaust gas system as a whole or for the motor vehicle is provided by supplementing a sound profile. By noise level is meant the summed level, i.e., the sum of all frequencies.

It may be provided advantageously that the noise level P2 of the sound profile is at least 3 dB to 5 dB or 2 dB to 7 dB larger than the noise level P1 of the exhaust gas system. The noise level P2 of the sound profile must be higher by a recognizable amount or an acoustically perceivable amount, so that on the whole an optimal sound image is achieved. The lower limit of 2 dB or 3 dB up to 5 dB or 7 dB constitutes a useful minimum amount here.

The real and the emulated engine sounds are measured from the outside. For this, an artificial head dummy is used, carrying a microphone at one or both ear positions. The head dummy is placed behind the vehicle. The position of the head dummy has a spacing of around 1.41 m from the end of the exhaust gas tailpipe in relation to the middle and a sideways offset of 45° in relation to the longitudinal axis of the motor vehicle. The ear positions or microphones are placed at a height of 1.2 m above the ground.

Furthermore, it can be advantageous when the emulated engine sound is formed from modulations of the major orders or engine major orders. Fundamental characteristics of the sound impression result from the presence or absence of certain engine harmonic orders and secondary orders, the major orders being of critical importance according to the invention.

Moreover it can be advantageous when the background noise is evaluated according to at least one of the harmonic frequencies and/or orders of the real engine sound masked therein and at least one of the harmonic frequencies and/or orders masked therein is determined and emulated. The harmonic frequencies and/or orders are critically important to the sound quality of the sound system. Accordingly, an evaluation of the masked frequencies in terms of the harmonic frequencies contained therein and their active emulation by the sound system is advantageous. The kind and number of the harmonic frequencies can be chosen at will. In particular, the first 50 harmonic frequencies will be especially considered.

BRIEF DESCRIPTION OF THE DRAWINGS

Further benefits and details of the invention are explained in the patent claims and in the specification and represented in the figures. There are shown:

A sound system 1 per FIG. 1 is provided as a supplement to a motor vehicle exhaust system 2 of a motor vehicle 4 and serves to emit emulated engine sounds. It comprises a housing 1.2 and, accommodated therein, a loudspeaker 1.1. The housing 1.2 is mounted separately from the motor vehicle exhaust system 2, centrally to the motor vehicle exhaust system 2 or its exhaust gas tailpipee 2.1, 2.1' at the height of a longitudinal axis 4.2 and it is decoupled in relation to the routing of an exhaust gas flow of the motor vehicle exhaust system 2. The housing 1.2 comprises two sound guidance tubes 1.3, 1.3' directed backward to the rear with an outlet zone 1.4, 1.4' each, being placed in the middle between the respective exhaust gas tailpipe 2.1, 2.1' and the longitudinal axis 4.2. The outlet zone 1.4, 1.4' of the respective sound guidance tube 1.3, 1.3' is modeled on an exhaust gas tailpipe 2.1, 2.1'. Thus, at the rear of the vehicle, the observer will recognize four exhaust gas tailpipes 2.1, 2.1', 1.4, 1.4', being placed symmetrically to the longitudinal axis 4.2; two on the right and two on the left of the longitudinal axis 4.2.

Furthermore, a control unit 3 is provided, by which a sound profile can be calculated on the basis of at least the engine operating parameters of number of revolutions and/or engine load and/or gear engaged and/or engine temperature and/or other parameters like status of the regeneration operation of the diesel filter. No regulating of the loudspeaker signal by feedback of an actual quantity detected by microphone is provided, such as would be needed for a classical AND (Active Noise Design) application. The loudspeaker is merely operated under control of the control unit 3. The housing 1.2 and the sound guidance tube 1.3 can receive the computed sound profile, decoupled from the exhaust gas flow, through the loudspeaker 1.1.

Figure 1:
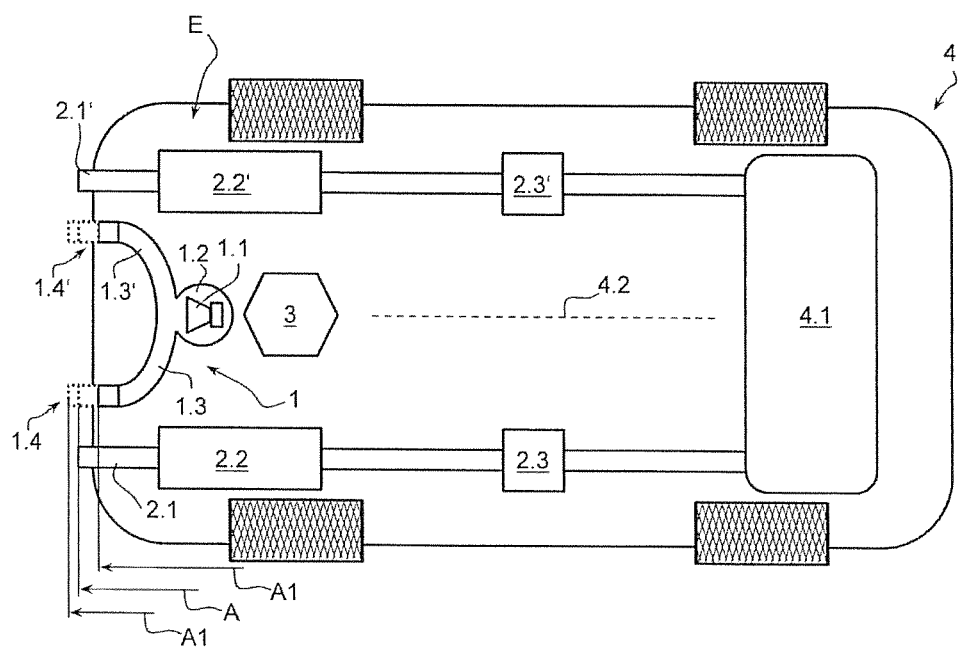
FIG. 1, a basic diagram of a motor vehicle with sound system.

The motor vehicle 4 comprises a motor vehicle engine 4.1 with the motor vehicle exhaust system 2 connected to the motor vehicle engine 4.1. The motor vehicle exhaust system 2 comprises two partial strands, each with an exhaust gas aftertreatment unit 2.3, 2.3' and a muffler 2.2, 2.2'. At one end E of the motor vehicle exhaust system 2 there is provided on each partial strand an exhaust gas tailpipe 2.1, 2.1' with a lengthwise dimension A. The housing 1.2 of the sound system 1 is situated in the area of the end E of the exhaust gas system 2 in relation to the exhaust gas routing, the respective outlet zone 1.4, 1.4' of the sound system 1 having a lengthwise dimension A1 in relation to a longitudinal axis 4.2 of the motor vehicle 4. The lengthwise dimension A1 can be greater than the lengthwise dimension A or equal to the lengthwise dimension A. According to the sample embodiment of FIG. 1, the lengthwise dimension A1 is smaller than the lengthwise dimension A.

Figure 2A:
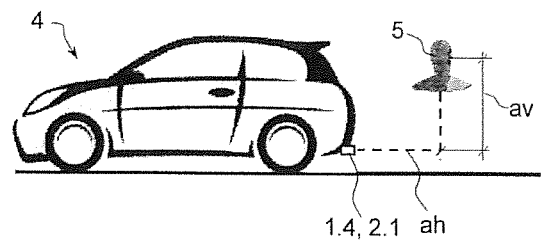
FIGS. 2a-b, a measurement layout for determining the loudness.
Figure 2B:
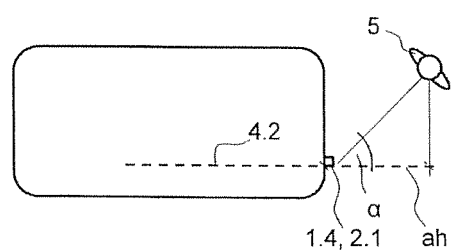

According to FIG. 2a, 2b, the real and the emulated engine sounds emerging from the respective exhaust gas tailpipe 2.1 or the respective outlet zone 1.4 are measured from the outside for the purpose of determination or evaluation and/or control. Because of the physical proximity between the respective exhaust gas tailpipe 2.1 and the corresponding outlet zone 1.4, only one sound source is shown stylized. For this, an artificial head dummy 5 is used, carrying a microphone at one or both ear positions. The head dummy 5 is placed behind the motor vehicle 4. The position of the head dummy 5 has a spacing ah of around 1.40 m from the end of the exhaust gas tailpipe 2.1 or the outlet zone 1.4 in relation to the middle of the head and a sideways offset of 45° in relation to the longitudinal axis 4.2 of the motor vehicle 4. The longitudinal axis 4.2 is offset to the side, for the plotting of the angle α in relation to FIG. 1. The ear positions or microphones are placed at a height av of 1.2 m above the exhaust gas tailpipe 2.1 or the outlet zone 1.4.

Figure 3:
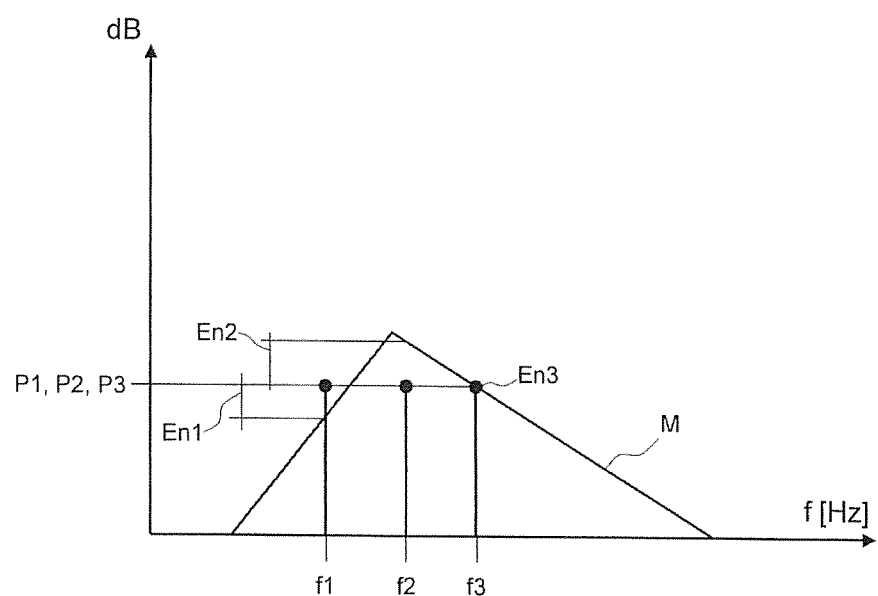
FIG. 3, a diagram of the masking process.

According to FIG. 3, an envelope M is plotted against the frequency f as a sum of all engine sounds by loudness in decibels (dB). The envelope M of the background noise is shown for simplicity with a roof shape and it represents the loudness level of the background noise as a function of the frequency. As an example, three frequencies f1, f2 and f3 are indicated with roughly the same loudness level P1, P2, P3. The loudness level P1 of frequency f1 is larger than that of the envelope M, while the loudness level P2 of frequency f2 is smaller than that of the envelope M. The frequency f2, whose loudness level P2 is smaller than that of the envelope M, is thus masked by the envelope M. The envelope M forms a masking curve. The emergence level En1 of frequency f2 is thus negative. The emergence level En1 of frequency f1 is positive, its loudness level is greater than that of the envelope M. Depending on the absolute magnitude of this emergence levels En1, the frequency f1 is acoustically perceivable, while the frequency f2 on account of the masking by the envelope M is not acoustically perceivable. The same holds for the frequency f3, whose loudness level P3 has the same magnitude as that of the envelope M, so that the emergence level En3 is equal to zero. Thus, the frequency f3 is likewise masked by the envelope M and not acoustically perceivable on account of the masking.

LIST OF REFERENCE SYMBOLS

1 Sound system
1.1 Loudspeaker
1.2 Housing
1.3 Sound guidance tube
1.3' Sound guidance tube
1.4 Outlet zone
1.4' Outlet zone
2 Motor vehicle exhaust system
2.1 Exhaust gas tailpipe
2.1' Exhaust gas tailpipe
2.2 Muffler
2.2' Muffler
2.3 Exhaust gas aftertreatment unit
2.3' Exhaust gas aftertreatment unit
3 Control unit
4 Motor vehicle
4.1 Motor vehicle engine
4.2 Longitudinal axis
5 Head dummy
A Lengthwise dimension
A1 Lengthwise dimension
ah Spacing horizontal
av Spacing vertical
E End of 2
En1 Emergence level
En2 Emergence level
En3 Emergence level
f1 Frequency 1
f2 Frequency 2
M Envelope, masking curve
P1 Loudness level
P2 Loudness level
P3 Noise level
α Angle

What is claimed is:
1. A method for generating of emulated engine sounds with a sound system comprising, at least one loudspeaker and at least one housing accommodating the at least one loudspeaker, wherein the housing is mounted separately from a motor vehicle exhaust gas system in terms of the routing of an exhaust gas flow, at least one sound guidance tube having an outlet zone being mounted on the housing, wherein the sound system has a microphone-free design, wherein a control unit is provided, by which on the basis of at least one of engine operating parameters of number of revolutions and/or engine load and/or gear engaged and/or engine temperature and/or other parameters like status of the regeneration operation of a diesel filter a sound profile can be computed, wherein the loudspeaker can receive a control signal corresponding to the sound profile through the control unit wherein the at least one loudspeaker receives a control signal, and on the basis of at least one of the engine operating parameters of number of revolutions and/or engine load and/or gear engaged and/or engine temperature and/or other parameters like status of the regeneration operation of the diesel filter a sound profile is generated, wherein an anticipated sound pattern is composed on the basis of the engine operating parameters; the sound profile computed by the control unit (3) and the sound pattern are mathematically overlayered to form a sound image, or at least compared with each other; the sound image is then investigated mathematically to see whether frequency components of the desired engine sound are masked by an envelope M, and therefore have an emergence level En with $\leq 0$; in event of a masking of one or more of these frequency components an adapting of the sound profile is done by amplifying these frequency components, so that these frequency components are demasked and have an emergence level En with En>0.

2. The method according to claim 1, wherein the outlet zone of the sound guidance tube is modeled on an exhaust gas tailpipe.

3. The method according to claim 1, wherein the housing and the sound guidance tube are provided with the computed sound profile through the loudspeaker, decoupled from the exhaust gas flow.

4. The method according to claim 1, wherein the emulated engine sound contains modulations of major orders.

5. The method according to claim 1, wherein the emulated engine sound is formed from modulations of the major orders.

6. The method according to claim 1, wherein a background noise is evaluated according to at least one of harmonic frequencies and/or orders of the real engine sound masked therein and at least one of the harmonic frequencies and/or orders masked therein is determined and emulated.

7. The method according to claim 1 applied to the sound system for a motor vehicle, comprising: a motor vehicle engine and with a motor vehicle exhaust system connected to the motor vehicle engine and having at least one exhaust gas tailpipe, wherein the exhaust gas tailpipe has a lengthwise dimension A, wherein the sound system is provided, wherein the housing is arranged in the area of one end E of the exhaust gas system in relation to the exhaust gas channeling, and the outlet zone of the sound system has a lengthwise dimension A1 with A1<=A or A1>=A in relation to a longitudinal axis of the motor vehicle.

8. The method according to claim 2, wherein the housing and the sound guidance tube are provided with the computed sound profile through the loudspeaker, decoupled from the exhaust gas flow.

9. The method according to claim 8, wherein the emulated engine sound contains modulations of major orders.

10. The method according to claim 5, wherein a background noise is evaluated according to at least one of harmonic frequencies and/or orders of the real engine sound masked therein and at least one of the harmonic frequencies and/or orders masked therein is determined and emulated.

* * * * *